United States Patent [19]

Stol

[11] Patent Number: 4,514,125
[45] Date of Patent: Apr. 30, 1985

[54] FASTENER IMPROVEMENT INCLUDING INTRODUCTION OF SELECTED CAPSULE OF ADHESIVE INTO POROUS BASKET HUNG IN BORE FOR ACTIVATION BY FASTENER INSTALLATION

[75] Inventor: Israel Stol, Monroeville, Pa.

[73] Assignee: Invocas, Inc., Columbus, Ohio

[21] Appl. No.: 398,448

[22] Filed: Jul. 14, 1982

Related U.S. Application Data

[63] Continuation-in-part of Ser. No. 359,894, Mar. 19, 1982, abandoned.

[51] Int. Cl.³ .................................................. F16B 39/02
[52] U.S. Cl. ...................................... 411/82; 411/258;
156/294; 156/295; 29/458; 29/460
[58] Field of Search ............... 411/82, 258; 156/294,
156/295; 29/458, 460

[56] References Cited

U.S. PATENT DOCUMENTS

| 3,298,144 | 1/1967 | Fischer | 29/460 X |
|---|---|---|---|
| 3,964,948 | 6/1976 | Busse | 156/91 |
| 4,263,832 | 4/1981 | Lang et al. | 411/82 |
| 4,313,697 | 2/1982 | Rozanc | 405/261 |
| 4,386,877 | 6/1983 | McDowell, Jr. | 405/261 |
| 4,425,065 | 1/1984 | Sweeney | 411/82 X |

FOREIGN PATENT DOCUMENTS 1338660 11/1973 United Kingdom ............... 411/82

Primary Examiner—Gary L. Smith
Assistant Examiner—Thomas J. Dubnicka
Attorney, Agent, or Firm—Cushman, Darby & Cushman

[57] ABSTRACT

Into a bore which is about to receive a fastener such as a screw, nail or bolt, an adhesive capsule support basket is first placed and mounted at a desired intermediate level. One or more capsule(s) containing adhesive is (are) inserted into the bore and become supported by the basket at the intermediate level. As the fastener is installed, it contacts and bursts the capsule(s), spreading the adhesive at the fastening region. The basket, which is rather flimsy, is destroyed by installation of the fastener, after having performed its role.

12 Claims, 9 Drawing Figures

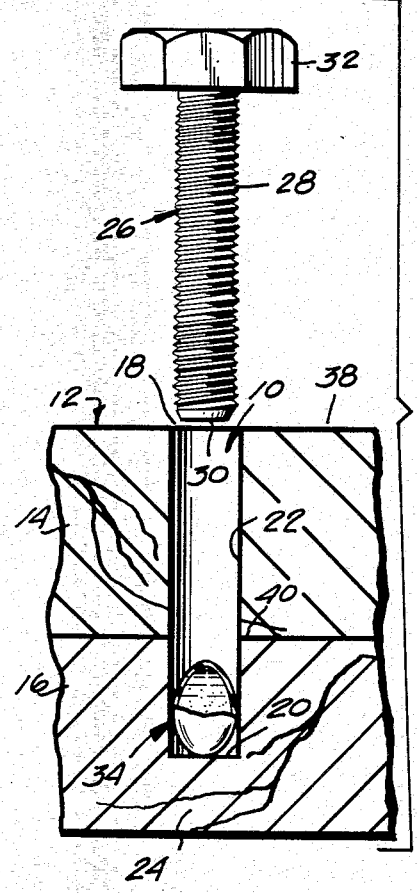
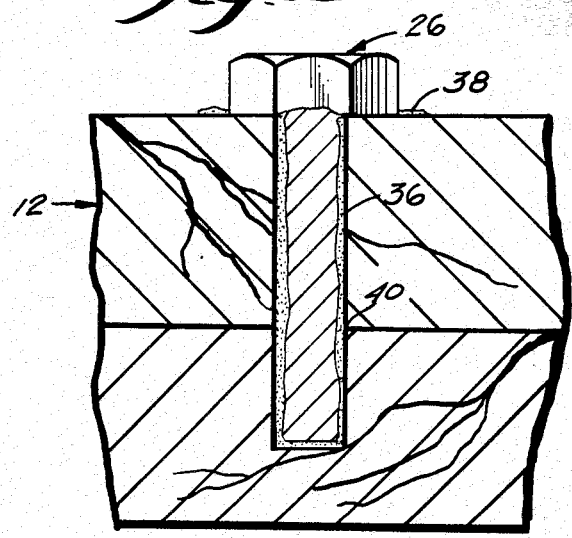
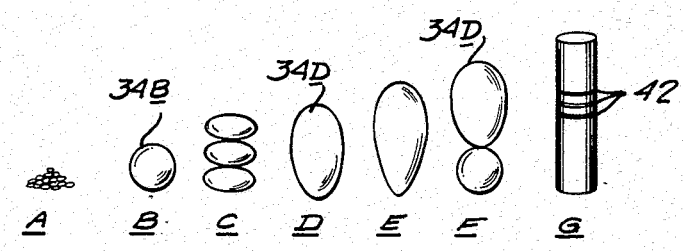
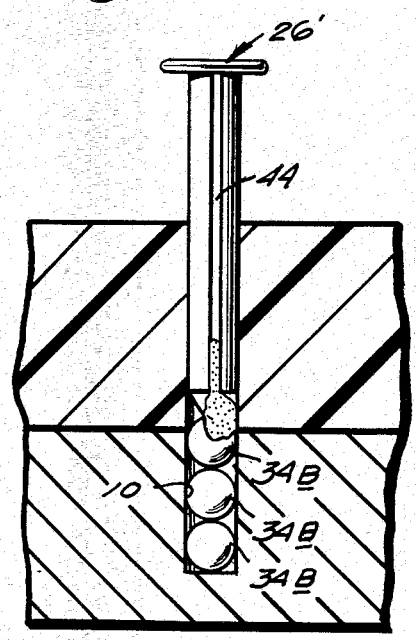
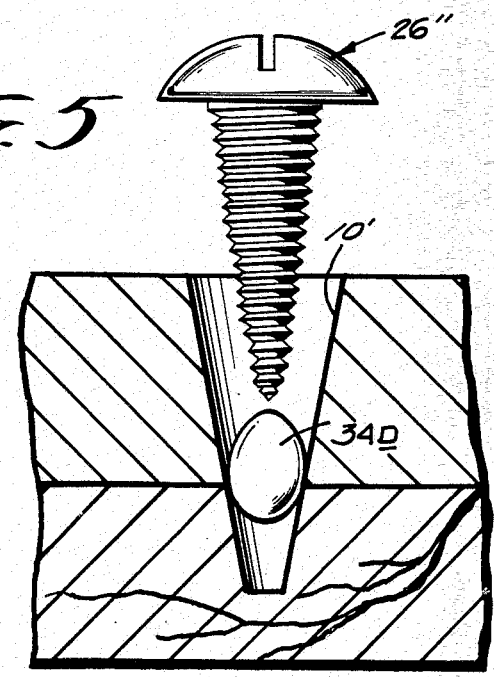

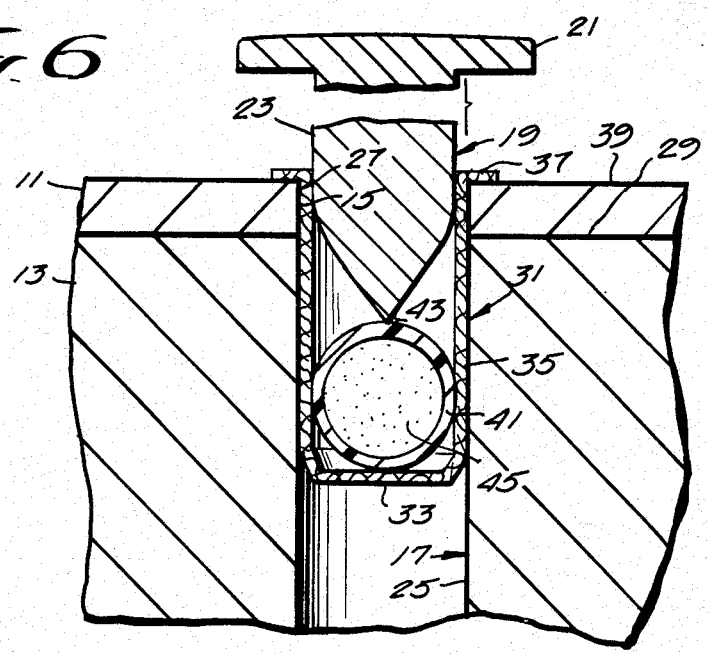
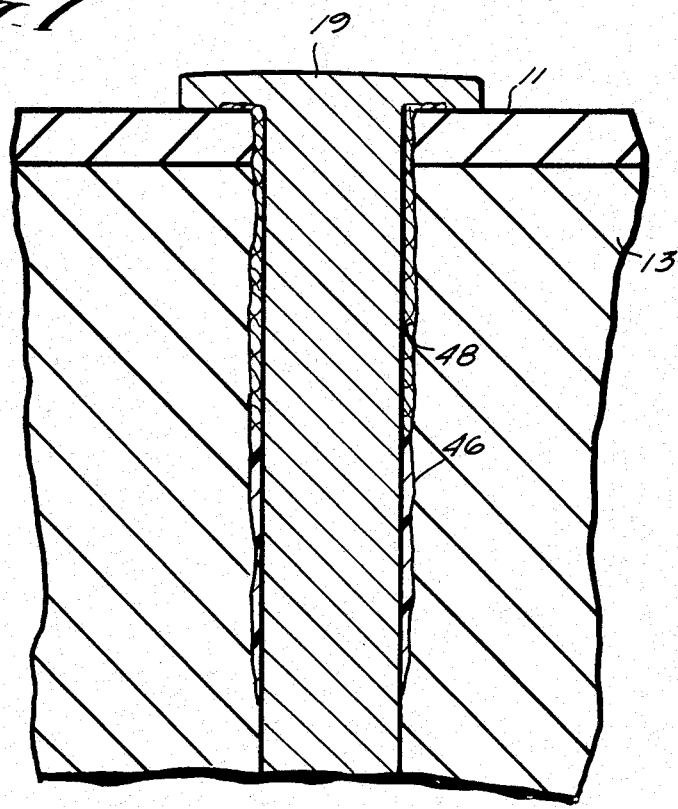

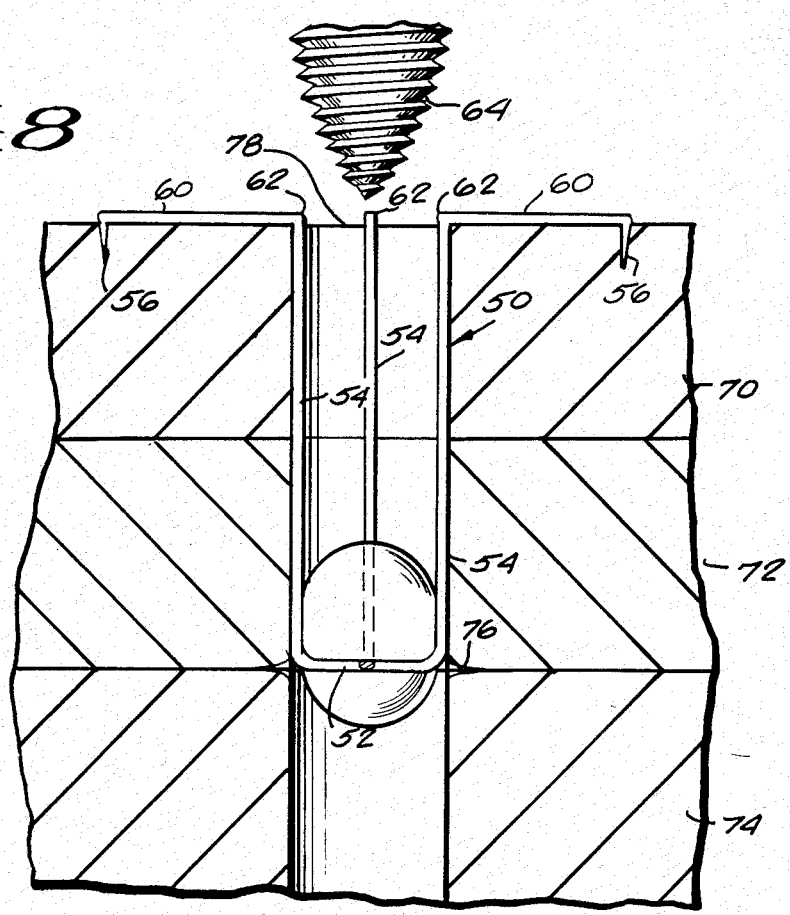
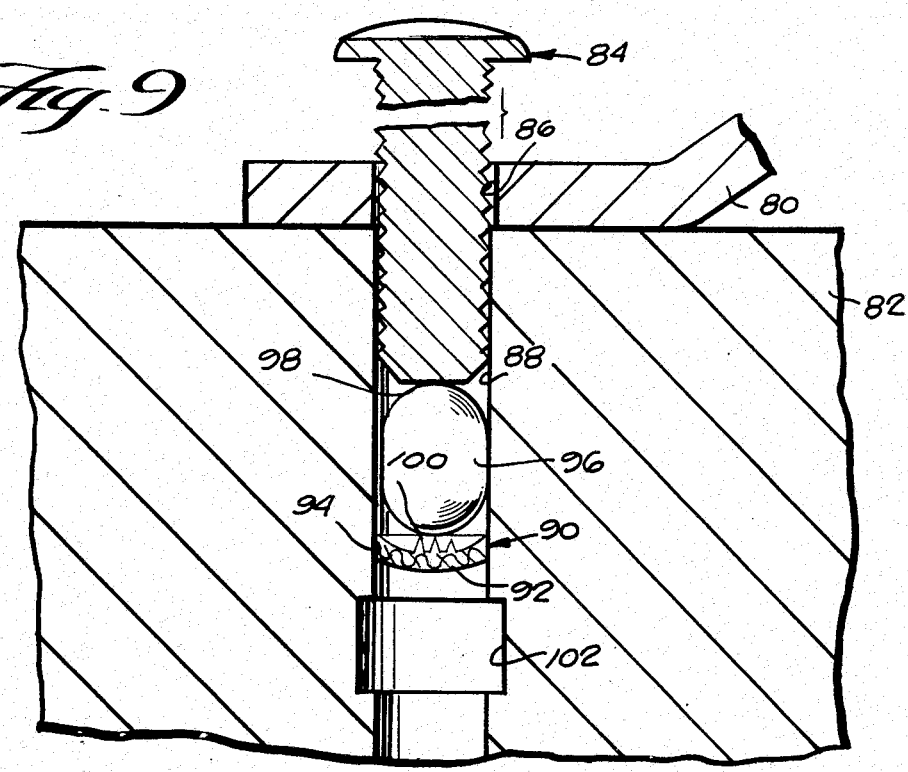

FASTENER IMPROVEMENT INCLUDING INTRODUCTION OF SELECTED CAPSULE OF ADHESIVE INTO POROUS BASKET HUNG IN BORE FOR ACTIVATION BY FASTENER INSTALLATION

REFERENCE TO RELATED APPLICATION

This is a continuation-in-part of my earlier-filed copending U.S. patent application Ser. No. 359,894, now abandoned, filed Mar. 19, 1982, now abandoned.

BACKGROUND OF THE INVENTION

The principle behind all available fasteners such as nails and bolts is development of intense but directionally controlled forces between them and the component(s) they are designed to fasten together. This always translates into the reliance for the "fastening function" upon the resultant shear-stress between the fastener and the component. The superior "fastening" capability of threaded fasteners over smooth nails, stems from the larger thread-area subjected to frictional stresses with the component. Numerous designs of fasteners, (nails, bolts, screws, etc.) capitalize on shapes and configurations that increase the surface area and their enhanced-mechanical holding capability to the components. Yet, none of these makes optimal use of the tremendous increase in "fastening strength" offered by chemically induced cohesive forces associated with adhesives.

While the conventional fasteners mechanically accomplish their function, introduction or regions adhesives into and about the fastening region or regions will yield superior results through chemo-mechanical means.

The benefits of adhesives are well established. Presently, when adhesives are applied in nailing, bolting and screwing operations, they are applied wastefully, inaccurately, and uncontrollably. Often the fastener is dipped into the adhesive prior to its introduction into the component being fastened or in case of "bolting", the adhesive can also be "smeared" into the hole made in the component. In either form of application, the adhesive spreads unevenly about the fastener.

In other prior art systems, a body of adhesvie carried in or on the fastener at the time the fastener is installed is subject to uncontrolled discharge where it is not wanted, to premature activation and deterioration of the adhesive. Installation may be complex and require the use of uncommon tools and techniques, removal of a partially installed fastener may be difficult, choice of adhesives is restricted, the choice of fastener sizes is limited, and gaps left between piston and body parts of some designs in prior art fasteners having adhesive reservoirs may invite corrosive attack.

In practicing the invention that is disclosed in my aforementioned related application, into a blind socket which is about to receive a fastener such as a screw, one or more capsule or capsules containing adhesive is or are first placed. As the fastener is installed, it bursts the capsule or capsules, spreading the adhesive at the fastening region. The capsules can be provided in a number of sizes and shapes, in order to facilitate placing the right amount of the right adhesive at the right place.

FIGS. 1–5 and the following related description concern the invention that is disclosed in my aforementioned related application.

FIG. 1 is a longitudinal cross-sectional view of a pre-formed socket having received a selected capsule of adhesive which is about to be ruptured by installation of a fastener;

FIG. 2 is a similar view of a later stage, in which fastener installation has been completed;

FIG. 3 is a side elevation view of a typical selection of capsules of adhesive;

FIG. 4 is a sectional view at a stage intermediate that of FIGS. 1 and 2, but of a modification; and FIG. 5 is a sectional view at a stage intermediate that of FIGS. 1 and 4, but of another modification.

In FIG. 1, a pre-formed socket 10 is shown formed in a material 12 that is to be fastened. As shown, the material 12 representatively comprises two layers, 14 and 16, with the socket opening outwards of the layer 14 of the material 12 at 18 and having a blind end 20 within the layer 16 of the material 12. The sidewall 22 of the socket 10 is in the instance shown, cylindrical, e.g. of substantially constant diameter from mouth to blind end.

The socket 10 may be formed in any convenient manner, e.g. by drilling, punching, burning, solvent attack, melting, etc. It may be formed in respective segments before the layers 14 and 16 are juxtaposed, or it may be formed in one continuous operation after the layers 14 and 16 are juxtaposed. The layers 14 and 16 may not be of the same thickness, and the material 12 may, instead be made of one, three, or more layers. The layers 14 and 16 need not be made of the same material nor need any layer be made of homogeneous material. Any layer may itself be made of a plurality of pre-united sub-layers.

The socket 10 may initially be formed as a blind socket, or it may be initially formed as a throughhole into one end of which a plug is pre-fitted, e.g. in the region 24 to cause the socket to have a blind end 20.

In FIG. 1, the fastener that is about to be installed in the socket 10 is an utterly conventional bolt 26 having a threaded shank 28 with a tip end 30 and a head 32.

Also in FIG. 1, a capsule 34 of adhesive has already been deposited in the socket 10. In this instance the capsule 34 is shown being of prolate-spheroidal shape, and of a minor diameter nearly equal to that of the sidewall of the socket. Accordingly, as the capsule 34 is simply deposited in the socket one-small-end-first, it slides down with its long axis remaining parallel to the long axis of the socket, and comes to rest at the bottom of the socket.

As the fastener 26 in being installed is jammed of threaded into the socket 10, the capsule is compressed to its bursting point, bursts between the tip end 30 of the fastener and the socket, and covers the interface 36 of the fastener 26 and material 12. How much of the interface gets covered in this operation depends on the filled volume of the capsule relative to the space available with the socket as the fastener 26 is fully inserted, upon the porosity of the material 12, and upon the initial placement of the capsule and/or the shape of the interface as the fastener is being inserted, particularly where some of the excess adhesive may escape to the surface, e.g. at 38 or into the material, e.g. at 40.

In FIG. 3, a typical selection of adhesive capsules are shown. At A is a pile of very small capsules, e.g. from micro-size or upwards to the size of conventional prills of lawn fertilizer. At B there is an individual spherical capsule. At C there is a stack of three individual oblate-spheroidal capsules. At D there is a single prolate-spheroidal capsule. At D there is a single teardrop-shaped capsule. At F there is a capsule as at D stacked upon a capsule as at B. At G there is a generally cylindrical capsule that is smaller in diameter than the capsules shown at D and E. Each of the capsules may be provided in more than one size, more shapes than those shown may be provided. Those of various sizes or containing different types of adhesive, or the same adhesive with different setting times, or strengths, and the like or containing complementary essential components of the same adhesive, may be coded in any convenient manner, such as having the capsule wall be of one or more colors keyed to a color key, or to have the capsule wall be made of transparent material and the adhesive as visible through it be of a color keyed to a color key, or to have various symbols, indicial, patterns, etc. applied to the capsule wall, as exemplified by the three central banding stripes 42 on the capsule at G.

The term adhesive is broadly used, not only to cover materials which cure, set, react, harden, dry, crystallize or freeze and act by means of chemical bonds to provide adhesion and/or cohesion that locks the fastener in place, but also such materials, as, in the course of going from a generally fluid state to a generally solid state establish a mechanical lock or interference fit.

The provision of capsules of adhesive that are separate from the fastener 26 and from the material 12 until just before the fastener is inserted in the socket 10 accounts for many of the advantages of the improved fastener of the invention, principally because the capsule or capsules to be used in any particular securement can be selected as a separate step from selection of the fastener 26 and from provision of the socket 10. In many instances it is also important to the user to be able to see and feel the capsule before placing it in the socket, i.e. to determine that it has the size, the shape and the color or markings which common sense and/or the color chart or the like indicate should be used for the particular securement, and to determine that the quantum of adhesive contained within the capsule is not stale (has not dried-out or otherwise gone bad while awaiting the moment of installation).

It has been determined, for instance, for the typical installation shown being accomplished in FIG. 4 that three capsules 34B should be used, e.g. to provide, upon bursting, a sufficient quantity of adhesive or to give the proper proportions of a multiple component adhesive such as two red-colored capsules of an epoxy resin flanking a blue-colored capsule of hardener for the epoxy resin. At the moment depicted, the tip end of the fastener which in this instance is a nail 26', has just pierced, punctured or burst the uppermost one of the capsules. Upon the next blow of the hammer (not shown) the other capsules will be burst and the fastener 26' will be driven fully home in the socket 10, spreading the adhesive in the fastening region comparable to the showing in FIG. 2.

For the nail 26', an utterly conventional nail may be used. However what is shown is a somewhat special nail, one that is provided with at least one and preferably a plurality of longitudinal grooves 44 in its shank. These accommodate some of the adhesive so that as the adhesive sets, a mechanical interlock is formed between the fastener 26' and the material 12 via the set adhesive.

Another variation is shown in FIG. 5 where the socket 10' is tapered, as is the shank of the fastener, which is in this instance, a sheet metal screw 26''. It has been determined, for instance, for the typical installation shown being accomplished in FIG. 5, that in order to make sure that adhesive is spread high enough in the interface, that the capsule 34D should lodge in the socket 10' well-above the blind end. Accordingly, a capsule 34D has been selected which is of so great a relevant diameter, that as it is deposited in the socket 10', it only falls until it comes to rest at a similar diameter level of the socket 10' as shown. Accordingly, as the screw 26'' is installed, it ruptures the capsule 34D at an earlier stage than it would have had the capsule been shorter or smaller.

The foregoing principles may be used to fasten together or consolidate any material 12 that customarily may be subjected to securement by fasteners 26, 26', 26'', or by similar fasteners including jam-fit fasteners, rivets, pins and the like, made of any suitable material including but not limited to steel, aluminum, brass, wood, nylon and fiberglass reinforced plastic.

The FIG. 5 embodiment is of particular present interest because it shows one way that an adhesive containing capsule may be temporarily suspended above the bottom of the hole, or indeed without regard to whether the hole has a bottom wall or is open-ended at the bottom. However, it is required in the disclosure of this species that the socket sidewall be specially configured in relation to the adhesive-containing capsule so that the capsule becomes lodged, suspended, or the like at the desired intermediate level.

The present invention relates to means for providing the advantages of the FIG. 5 embodiment for instances where it is not feasible to directly engage the capsule of adhesive with the sidewall of the hole at an intermediate level prior to installation of the fastener. Thus the present invention is particularly useful where the hole is a straight-sided throughbore.

SUMMARY OF THE INVENTION

Into a bore which is about to receive a fastener such as a screw, nail or bolt, an adhesive capsule support basket is first placed and mounted at a desired intermediate level. One or more capsule or capsules containing adhesive is or are inserted into the bore and become supported by the basket at the intermediate level. As the fastener is installed, it contacts and bursts the capsule or capsules spreading the adhesive at the fastening region. The basket, which is rather flimsy, is destroyed by installation of the fastener, after having performed its role.

BRIEF DESCRIPTIONS OF THE DRAWINGS

FIGS. 1–5, which relate to the invention that is disclosed in applicant's aforesaid parent application are described in the Background section hereinabove.

FIG. 6 is a longitudinal cross-sectional view of a pre-formed bore having received a basket which supports a capsule of adhesive at an intermediate level in the bore, the capsule being about to be ruptured by installation of a fastener;

FIG. 7 is a similar view of a later stage in which fastener installation has been completed;

FIG. 8 is a view similar to FIG. 6, but of an embodiment with a first modified form of basket; and FIG. 9 is a view similar to FIG. 6, but of an embodiment with a second modified form of basket.

DETAILED DESCRIPTION

In the embodiment shown in FIG. 6, there are shown two superposed layers 11, 13, of substrate material such as metal plate and wood, having coaxially aligned pre-made bores 15, 17. The task at hand is to fasten these two layers together at the site depicted, using a fastener such as a nail 19 by driving the nail into the bores by impacting it on the head 21 using a hammer or other driving tool. However, to insure that the nail 19 does not loosen-up or back-out as time goes by, e.g. due to the effects of vibration, thermal cycling and the like, it is desired to anchor the fastener shank sidewall 23 to the bore wall 25 at a level that is intermediate the thickness of the composite substrate 11/13. Generally this level will be at least as far into the composite bore 15/17 from the mouth end 27 through which the fastener is to be installed as the level of the interface 29 between the layers 11 and 13, so that the anchorage thus formed includes a portion on the opposite side of the interface 29. Accordingly, when the fastener is in place, the fastener head 21 pulls the layer 11 against the layer 13 and the fastener shank anchor provides a reaction force at or beyond the interface 29 to keep the layer 11 pulled tightly against the layer 13 by the fastener head 21.

In the instance depicted in FIG. 6, the task of anchoring the fastener shank is complicated by the fact that the bore 15/17 either is a throughbore, or else its blind end, if it has one, is so far beyond the level where the anchorage should be established that one cannot simply deposit one or more adhesive capsules into the bore 15/17 for support on the socket floor as in FIG. 1. The task is further complicated by the fact that the bore wall 25 is not tapered, so one cannot simply choose an adhesive capsule that would cause it, when deposited to come to rest in the vicinity of the level of the desired anchorage as in FIG. 5.

According to the principles of the embodiment of the invention that is shown in FIGS. 6 and 7, the problem is solved with the aid of a capsule support basket 31. In this embodiment, the basket 31 is a generally cup-shaped member having an inner end wall or floor 33, an upstanding circumferential sidewall 35 and, at the opposite, open end from the floor 33, a radially outwardly extending lip, annular flange or tab means 37. The basket 31 has its sidewall 35 of an outer diameter that will permit the basket to be inserted floor-end first through the bore mouth 27 into the bore 15/17 and axially advanced therein until the tab means 37 engages the outer face 39 of the layer 11 peripherally of the bore mouth 27. The capsule support basket 31 is selected to be of such a length that when the basket is fully seated in the bore 15/17, the basket floor 33 is disposed at a level to support an adhesive capsule 41 at the level where the shank-to-bore wall anchor is to be established.

The selected adhesive-containing capsule 41 may be deposited into the basket 31 after the basket has been seated in the bore, or the capsule 41 may be pre-installed in the basket and this basketed capsule composite then inserted and seated in the bore.

Comparing FIGS. 6 and 7, as the fastener 19 is driven into the bore 15/17, the point 43 at the nose of the shank pierces the basketed capsule 41 releasing the adhesive 45 which forms into a generally annular interfacial anchor band 46 between the shank 23 and bore wall 25 at the desired level. The fact that some of the adhesive 45 may be dragged or may run further into the bore than the level at which the capsule initially was supported on the basket floor is easily accounted for by selecting the basket to have its floor located toward the upper extreme of where the anchor band 46 is to be formed.

In the course of driving in the fastener, the basket 31 is more or less destroyed so that what remains are remnants 48. The basket 31 typically may be made of thin molded plastic material such as nylon, of molded or formed screening material such as nylon, aluminum, bronze, steel or the like of paper or other felted or non-woven fibrous material, of shellacked fabric, of the same plastic, gelatin or other encapsulating material as is used for initially encapsulating the adhesive 45 in the capsule 41, or the like. All that is necessary is that the basket be capable of temporarily supporting the capsule at the desired level, that when the fastener 19 engages the capsule that the basket retain its supportive capability until the capsule has been ruptured, and that once the capsule is ruptured the basket be capable of becoming easily sacrificed into remnants which do not materially hinder completion of installation of the fastener nor interfere with the establishment and preservation of the desired anchor band 46. Also, the basket should be perforated and/or porous to allow flow of adhesive through it.

A further embodiment is shown in FIG. 8. Here, the basket 50 is in the form of a wire armature having a hoop 52 and trailing legs 54 with initially out-turned staple-type chisel pointed feet 56 at the free ends. The adhesive capsule 58 is pre-assembled to the basket 50 by pressing it into the hoop 52. As an alternative the body of encapsulated adhesive 58 may be molded onto this portion of the armature. After it is determined how far down into the bore the capsule 58 should be suspended in order to form the adhesive anchor band the right level, the outer end portions 60 of the trailing legs 54 are bent-over at right angles at the corresponding sites 62 and this thus-adjusted basketed adhesive capsule is installed as shown, with the chisel points 56 being pressed into the outer face of the outer layer of material in order to fix the suspension. Finally, the fastener, in this case a screw 64 is installed in the bore 66. The basket 50 disposes the adhesive capsule as shown until the nose 68 of the fastener 64 breaks the capsule and causes and permits the adhesive to form the desired interfacial anchor band at the desired level. Note that as shown in FIG. 8, the object is to use the fastener 64 to secure three layers 70, 72, 74 together and that the anchor band of adhesive is to be formed at or beyond the layer/layer interface 76 that is axially furthest from the bore mouth 78 through which the fastener is installed.

Another embodiment is illustrated in FIG. 9. Here, the object is to secure the part 80 onto the base 82 by means of a fastener such as a bolt 84 installed in coaxially aligned bores 86, 88. There are three things to notice about this embodiment:

The basket 90, rather than having a floor, sidewall means and out-turned tab means consists of a floor 92, e.g. an oversized disk-shaped element that is inserted into the bore 88 in a preliminary step, and forced down to the desired level, e.g. using a tubular pusher (not shown), which is then withdrawn. The pusher may have depth gradations marked on its exterior sidewall to facilitate displacement of the basket 90 down to the desired level. Due to its initial oversize relative to the diameter of the bore 88 down to the basket placement level, and due to the fact that the basket 90 preferably is made of stiffly resilient material, its outer peripheral edge 94 tends to strongly frictionally engage the bore wall to maintain the level of placement. Next an adhesive capsule 96 is introduced into the bore 86/88 and comes to rest on the basket 90 at the desired level. Finally, the fastener 84 is installed. In this instance, the fastener 84 is blunt nosed at 98, so the function of the nose is not directly to pierce the adhesive capsule 96, but rather to force the capsule down against the basket floor 92, which, as shown, is centrally provided with upwardly projecting prong means 100. These are thereby forced to pierce the capsule, causing the adhesive to run out and to become spread at the fastener shank/bore sidewall interface at the desired level. To facilitate formation of the anchor as a desired annular band, the bore has been shown reamed or under cut as a preliminary matter to form a circumferential groove 102 at the anchor level. The released adhesive will flow into this groove and cure, harden, set or otherwise become operative.

In order to avoid unduly multiplying the length of this description and the sheets of drawings, suffice it to disclose here that each feature shown or described in relation to FIGS. 6 and 7 may be correspondingly used instead of or in addition to the embodiment described in relation to FIG. 8 and/or FIG. 9, each feature shown or described in relation to FIG. 8 may be correspondingly used instead of or in addition to the embodiment described in relation to FIGS. 6 and 7 and/or FIG. 9, and each figure shown or described in relation to FIG. 9 may be correspondingly used instead of or in addition to the embodiment described in relation to FIGS. 6 and 7 and/or FIG. 8. The types of fasteners shown may be interchanged or exchanged for other types of conventional fasteners. Any feature shown or described in relation to any of FIGS. 1-5 may be correspondingly used, used instead of or used in addition to the embodiment described in relation to FIGS. 6 and 7, FIG. 8 and/or FIG. 9. For example, with regard to the embodiment shown and described in relation to FIG. 8, it is within the contemplation of the invention to use the nail of FIGS. 6 and 7 in place of a screw as the fastener, to provide an anchor shape-forming groove at the anchor site as described in relation to FIG. 9, to use a multiple-body, multiple-component adhesive as described in relation to FIG. 4, at least one capsule of which is color coded as described in relation to item G of FIG. 3.

In effect, the act of installing the basket in accordance with the principles of the present invention serves to provide an at least temporary, at least partial blind end for the bore in which the fastener is being installed.

It should now be apparent that the fastener improvement, including introduction of selected capsule of adhesive into a porous basket hung in a bore for activation by fastener installation as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A fastener improvement, comprising:
material to be fastened, having means defining a bore therein through a face thereof, said bore having a mouth, an axially extending peripheral sidewall and an inner end;
a fastener having a shank with a tip end and a head, the fastener being adapted to have the tip end and shank thereof received in said bore through said mouth;
a basket for adhesive capsule means including floor means for supporting adhesive capsule means, and means for disposing the floor means at a selected intermediate level in said bore substantially before said inner end; and
adhesive capsule means including at least one thin-walled jacket encapsulating a respective quantum of adhesive, each such capsule being adapted to be received in the bore and supported upon said floor means ahead of the tip end of said fastener and to have the jacket thereof ruptured by compressive engagement between the fastener tip end and the floor means of said basket so as to spread said adhesive into the interfacial fastening region that is defined between said fastener shank and said material within said bore;
said floor means disposing means said basket include tab means for externally engaging said material about the perimeter of said bore mouth, and connector means extending axially between said floor means and said tab means; and
said connector means and tab means being provided as a plurality of respective leg members each having a connector means portion integrally joined to a tab means portion.

2. The fastener improvement of claim 1, wherein:
said bore is an open-ended throughbore and said fastener shank is axially shorter than said throughbore;
said floor means disposing means of said basket is constructed and arranged to dispose said floor means at an intermediate level in said bore that is closer to said bore mouth than the length of the shank of the fastener; and
the basket is constructed and arranged to be effectively destroyed by further progress in installation of the fastener, subsequent to rupture of said adhesive capsule means.

3. The fastener improvement of claim 1, including:
piercing means on said fastener tip end, said piercing means being constructed and arranged to rupture the adhesive capsule means as said adhesive capsule means is compressed against the floor means of the basket by installation of the fastener.

4. The fastener improvement of claim 1, wherein:
said basket and said adhesive capsule means is constituted by a subassembly which is contructed and arranged to be disposed as a unit in relation to said bore for engagement of the adhesive capsule means in said bore by said fastener in connection installation of said fastener.

5. The fastener improvement of claim 1, wherein:
said floor means of said basket is constituted of foraminous, relatively flimsy material.

6. The fastener improvement of claim 1, wherein:
each leg member is made of pliably bendable material so that each may be field-bent at any selected site therealong to set the length of the connector means portion thereof.

7. For installation in respect to a material that is to be fastened, which material has means defining a bore therein, including amouth at a face, a bore wall and an inner end,
a fastener improvement, comprising:
a basket including means insertable into said bore through said mouth for providing a support platform for a body of adhesive at a desired intermediate level substantially before said inner end;
a fastener having a shank with a tip end, and a head, the fastener shank being insertable tip end first into said bore; and a body of adhesive adapted to be received in said bore through said mouth and supported on said support platform at said desired level;

the fastener shank being of such length that as said fastener shank is inserted into said bore said body of adhesive material while supported on said support platform providing means contacts said shank and said bore wall and thereby adhesively connects the fastener to the material in the vicinity of said desired level;

support platform disposing means for said basket including tab means for externally engaging said material about the perimeter of said bore mouth, and connector means extending axially between said support platform and said tab means; and said connector means and tab means being provided as a plurality of respective leg members each having a connector means portion integrally joined to a tab means portion.

8. The fastener improvement of claim 7, wherein:
said body of adhesive is provided in the form of adhesive capsule means including at least one thin-walled rupturable jacket encapsulating a respective quantum of adhesive.

9. The fastener improvement of claim 8, wherein: said support platform is constructed of relatively flimsy material and arranged to be effectively destroyed by further progress in installation of said fastener, subsequent to rupture of said adhesive capsule means.

10. The fastener improvement of claim 8, further including:
piercing means on said fastener tip end, said piercing means being constructed and arranged to rupture the adhesive capsule means as said adhesive capsule means is compressed against the support platform of the basket by installation of the fastener.

11. The fastener improvement of claim 8, wherein:
said basket and said adhesive capsule means are constituted by a subassembly which is constructed and arranged to be disposed as a unit in relation to said bore for engagement of the adhesive capsule means in said bore by said fastener in connection with installation of said fastener.

12. The fastener improvement of claim 7, wherein:
each leg member is made of pliably bendable material so that each may be field-bent at any selected site therealong to set the length of the connector means portion thereof.

* * * * *